(12) United States Patent
Peeters et al.

(10) Patent No.: US 7,477,843 B1
(45) Date of Patent: Jan. 13, 2009

(54) METHOD OF AND SYSTEM FOR ROUTING IN A PHOTONIC NETWORK

(75) Inventors: Bram Peeters, Harlow (GB); Friskney Robert, Harlow (GB); James Shields, Whitehead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1109 days.

(21) Appl. No.: 10/656,543

(22) Filed: Sep. 5, 2003

(51) Int. Cl.
*H04B 10/00* (2006.01)
*H04J 14/00* (2006.01)

(52) U.S. Cl. .................... 398/57; 398/49; 398/5

(58) Field of Classification Search .............. 398/5, 398/7, 45, 46, 48–50, 55–58; 370/254, 255, 370/351, 400, 401
See application file for complete search history.

(56) References Cited

U.S. PATENT DOCUMENTS

| | | | |
|---|---|---|---|
| 5,884,017 A * | 3/1999 | Fee ............................ 714/4 |
| 7,039,009 B2 * | 5/2006 | Chaudhuri et al. ........ 370/225 |
| 2004/0136324 A1 * | 7/2004 | Steinberg et al. .......... 370/238 |
| 2004/0190444 A1 * | 9/2004 | Trudel et al. .............. 370/224 |
| 2004/0228323 A1 * | 11/2004 | Acharya et al. ........... 370/351 |

\* cited by examiner

*Primary Examiner*—Dalzid Singh
(74) *Attorney, Agent, or Firm*—Barnes & Thornburg LLP

(57) ABSTRACT

A method of and system for determining a path through which to route a connection in a photonic network in which optically viable photonic paths of one or more physical links are determined and considered as "virtual" links in a "virtual" topology. Routing is then performed using the "virtual" topology rather than the physical topology to compute "virtual" paths of one or more "virtual" links.

18 Claims, 11 Drawing Sheets

| INPUT INTERFACE | BASIC INPUT PARAMETERS | BASIC RETURN PARAMETERS |
| --- | --- | --- |
| ROUTE TABLE QUERY | UNRESOLVED ROUTE ELEMENT | ORDERED LIST OF SNPPs |
| LOCAL TOPOLOGY IN | LOCAL TOPOLOGY UPDATE | — |
| NETWORK TOPOLOGY IN | NETWORK TOPOLOGY UPDATE | — |
| OPTICAL VIABILITY RESPONSE | YES OR NO | |

120 — ROUTE TABLE QUERY
122 — LOCAL TOPOLOGY IN
124 — NETWORK TOPOLOGY IN
126 — OPTICAL VIABILITY RESPONSE

| OUTPUT INTERFACE | BASIC OUTPUT PARAMETERS | BASIC RETURN PARAMETERS |
| --- | --- | --- |
| LOCAL TOPOLOGY OUT | LOCAL TOPOLOGY UPDATE | — |
| NETWORK TOPOLOGY OUT | NETWORK TOPOLOGY UPDATE | — |
| OPTICAL VIABILITY QUERY | ORDERED LIST OF SNPPs | — |

128 — LOCAL TOPOLOGY OUT
130 — NETWORK TOPOLOGY OUT
132 — OPTICAL VIABILITY QUERY

FIG. 8

METHOD OF AND SYSTEM FOR ROUTING IN A PHOTONIC NETWORK

FIELD OF THE INVENTION

The present invention relates to a method of and a system for selecting a path through which to route a connection in a photonic network.

BACKGROUND OF THE INVENTION

Optical networks, such as the Synchronous Optical Network (SONET), Synchronous Digital Hierarchy (SDH) transport networks and Optical Transport Network (OTN) are well known. Through the use of Wavelength Division Multiplexing (WDM) or Dense WDM (DWDM), these optical networks are able to meet the bandwidth and capacity requirements of many new telecommunications services.

However, telecommunications providers have, in the past, deployed such optical networks after considerable planning through manual processes taking many months. Typically, the network architecture would be designed, equipment ordered, installed, tested and then connections provisioned across the network. The use of ring topologies and optical cross connects has brought about the ability to set up end-to-end connections without manual intervention and to re-route connections upon failure. However, such topologies are still largely pre-planned, difficult to scale and generally unsuitable for providing on-demand services. Furthermore, interoperability between different vendor's equipment and different telecommunications providers has been problematic.

There is now significant momentum in the telecommunications industry to migrate towards a more flexible optical network employing a mesh topology where there is no need to verify every possible photonic path at design time. It is desired that such a network be equipment vendor and telecommunications provider neutral so that a telecommunications provider may deploy equipment from multiple vendors and so that connections may be automatically provisioned through multiple telecommunications provider's administrative domains. If such flexibility can be achieved, future optical networks will have many advantages including improved reliability, utilisation efficiency and the ability to provide new services including on-demand services such as Internet access, Virtual Private Networks (VPNs), Digital Video Broadcast (DVB) and so on.

It is expected that future networks will employ purely photonic switches as well as optical switches with electronic cores. Optical switches with electronic cores (OSs) perform optical-electronic-optical (OEO) conversion in that received optical signals are converted into electronic signals which are electronically switched and then converted back into optical signals for onward transmission. In contrast, purely photonic switches (PSs) switch wavelengths without OEO conversion. PSs may be implemented using various well-known devices including liquid crystal and Micro Electromechanical Systems (MEMS) devices. Henceforth in this document, an optical network which uses PSs in some or all of its nodes will be referred to as a photonic network. OSs and PSs will be collectively referred to a Cross Connects (XCs). Note that a single XC may be capable of functioning as either a OS or PS and this functionality may be dynamically selected.

With the introduction of meshed networks with optical flexibility points—ie XCs—routing of end-to-end connections becomes important. Routing protocols, such as Open Shortest Path First (OSPF) and Intermediate System to Intermediate System (IS-IS), which are known in the Internet Protocol (IP) domain are being adapted to provide mechanisms for routing in the optical domain. Typically, such routing protocols use algorithms to find the lowest cost or lowest distance path to route the connection through the network.

However, routing in photonic networks must take account of peculiarities of the optical transmission media which are quite unlike electronic transmission media used in conventional electronic IP networks. Various photonic effects impair the optical signal being transmitted and limit the maximum reach of the optical transmission media. These effects include power loss, noise, chromatic dispersion, Polarisation Mode Dispersion (PMD) and non-linear effects such as Cross Phase Modulation (XPM), Four Wave Mixing (FWM) and others. When an optical signal is routed through multiple consecutive PSs, the signal impairment accumulates. There comes a point where the cumulative impairment of the optical signal reaches an unacceptable level in terms of signal quality or bit error rate (BER). This means that a path computed by a routing algorithm may not be viable because it may contain a path segment through multiple consecutive PSs in which the cumulative photonic effects impair the optical signal at an unacceptable level. The problem is exacerbated by the fact that these photonic effects depend not only on the static configuration and specifications of the optical transmission media, but also on the dynamic state of existing connections provisioned across the network. The addition or removal of a wavelength from a transmission link will change the photonic effects that occur not only at that link but also the cumulative impairment that occurs at further transmission links.

One known approach to solving this problem is to design the photonic network to include "optical islands" in which all paths through the optical islands are designed to be optically viable in all circumstances. By employing only OSs at the boundary nodes of the islands, any path computed by a routing algorithm (possibly through multiple optical islands) will be guaranteed to be optically valid. However, this solution requires pre-planning and does not provide many of the advantages of an unplanned network mentioned above, such as scalability and efficiency.

Other known approaches to solving this problem involve modifying the routing algorithms to incorporate optical constraints and thus to ensure that the computed path is optically viable. However, as described above, photonic effects are complex and depend on both the static configuration and specifications of the optical transmission media and the dynamic state of connections provisioned across the network. As a result, such approaches tend to produce over-complex routing algorithms which are computationally intensive, if not intractable.

The ultimate objective for optimal routing is a system which addresses a set of demands at the least financial cost. However, given the above-mentioned complexity, previous work has often ignored this and instead optimised for least optical impairment as this guarantees a viable path if there is one to be found, but also optical impairment generally has some correlation with actual equipment cost. This approximation is usually valid because most equipment within a particular line system is likely to be of roughly similar performance therefore impairment is proportional to equipment used. However, where line systems are mixed (more likely in a larger photonic network), fibre types are mixed, financial arrangements intervene (e.g. rent-on-demand fibres that are much more expensive than operator owned fibres) or for many other reasons, this approximation may break down. Prior art mechanisms have been produced to perform a dual optimisation between the two factors of cost and optical viability, but these usually have fixed models of both—and often don't deliver a guaranteed optimal cost.

OBJECTS OF THE INVENTION

The invention seeks to provide an improved method and apparatus for determining a path through a photonic network which is optically viable and which ameliorates at least some of the problems of prior art approaches.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention, there is provided a method of selecting an optically viable path through which to route a connection from a first node to a second node of a photonic network, the method comprising:
    selecting a plurality of optically viable photonic paths in the photonic network, at least one of the optically viable photonic paths comprising a plurality of consecutive optical links;
    using a routing algorithm to select a path from the first node to the second to node, the routing algorithm using the plurality of optically viable photonic paths as at least part of the topological context when selecting the path.

Advantageously, by selecting a plurality of optically viable photonic paths and by performing routing using this plurality of optically viable photonic paths as the topological context, the routing algorithm will select an optically viable path but does not need to consider optical viability as a constraint itself. Optically viable photonic paths are considered as a simple "virtual" links by the routing algorithm. The routing algorithm routes using a topological space containing "virtual" links (ie the optically viable photonic paths).

The step of selecting a plurality of optically viable photonic paths may comprise:
    passing data identifying a first possible path in the photonic network to an optical viability checking function;
    in response, receiving data indicating a measure of optical viability of the first possible path from the optical viability checking function; and
    determining whether to include the first possible path in the plurality of optically viable photonic paths in dependence on the received data.

In one embodiment of the present invention, the data indicating a measure of optical viability of the first possible path is generated by modelling cumulative photonic effects that would occur if a connection were provisioned over the first possible path.

The cumulative photonic effects may be modelled on the basis of the data representing the static state of at least part of the photonic network. Also, the cumulative photonic effects may be modelled on the basis of the data representing the dynamic state of at least part of the photonic network.

In another embodiment of the present invention, the data indicating a measure of optical viability of the first possible path is generated by performing a rule-based function in respect of the possible path.

The step of selecting a plurality of optically viable photonic paths may comprise the step of passing data identifying a second possible path in the photonic network to an optical viability checking function in dependence on the received data indicating a measure of optical viability of the first possible path.

Preferably, the routing algorithm uses a combined metric for the at least one optically viable photonic path comprising a plurality of consecutive optical links, the combined metric being calculated in dependence on metrics associated with the plurality of consecutive optical links. Also preferably, the combined metric is calculated in dependence on a metric associated with the one or more photonic switches linking the plurality of consecutive optical links.

In one embodiment of the present invention, only those optically viable photonic paths with terminating nodes which perform electronic switching are included in the plurality of optically viable photonic paths.

In another embodiment of the present invention, only those optically viable photonic paths with terminating nodes which are capable of being dynamically controlled to perform electronic switching are included in the plurality of optically viable photonic paths, and wherein the method comprises the step of:
    provisioning a connection across the selected path from the first node to the second node;
    controlling terminating nodes of the one or more optically viable photonic paths of the selected path to perform electronic switching at least for an optical wavelength provisioned.

In one embodiment of the present invention the data indicating a measure of optical viability is a Boolean result. In another embodiment of the present invention, the data indicating a measure of optical viability is a confidence interval.

According to a second aspect of the present invention, there is provided a system for use in a photonic network, the system comprising:
    a database arranged to store a plurality of optically viable photonic paths in the photonic network, at least one of the optically viable photonic paths comprising a plurality of consecutive optical links; and
    a routing function using a routing algorithm to select a path in the photonic network, the path comprising at least one of the plurality of optically viable photonic paths, the routing algorithm using the plurality of optically viable photonic paths as at least part of the topological context when selecting the path.

Other aspects of the present invention are set out in the appended claims. For example, an aspect of the invention provides a computer program product stored on a computer-readable medium for performing a method of the invention.

The invention is also directed to a method by which the described apparatus operates and including method steps for carrying out every function of the apparatus.

The preferred features may be combined as appropriate, as would be apparent to a skilled person, and may be combined with any of the aspects of the invention.

There now follows a detailed description, by way of example only, of preferred embodiments of the present invention in which:

BRIEF DESCRIPTION OF THE DRAWINGS

FIG. 8 shows in table form the interfaces of a routing controller;

DETAILED DESCRIPTION OF EMBODIMENTS OF THE INVENTION

These embodiments represent the best ways of putting the invention into practice that are currently known to the Applicants although they are not the only ways in which this could be achieved.

Control of XCs in a photonic network will be achieved through the introduction of a network control plane 'above' the transport plane. Various telecommunications standards bodies are currently working towards defining protocols, architecture and functional requirements of such a control plane.

Notably, the International Telecommunication Union (ITU-T) has produced architectural and functional recommendations for what is called the Automatically Switched Transport Network (ASTN), also sometimes referred to as the Automatically Switched Optical Network (ASON). The general architectural specification of the ASTN is set out in ITU-T Recommendation G.8080. The recommendations concerning routing architecture and functionality of the ASTN are set out in ITU-T Recommendation G.7715. The present invention will now be described with reference to the ASTN although the reader will appreciate that the present invention is not limited to photonic networks complying with the ASTN recommendations, but applies in general to any photonic network in which connections may be routed.

Figure 1:
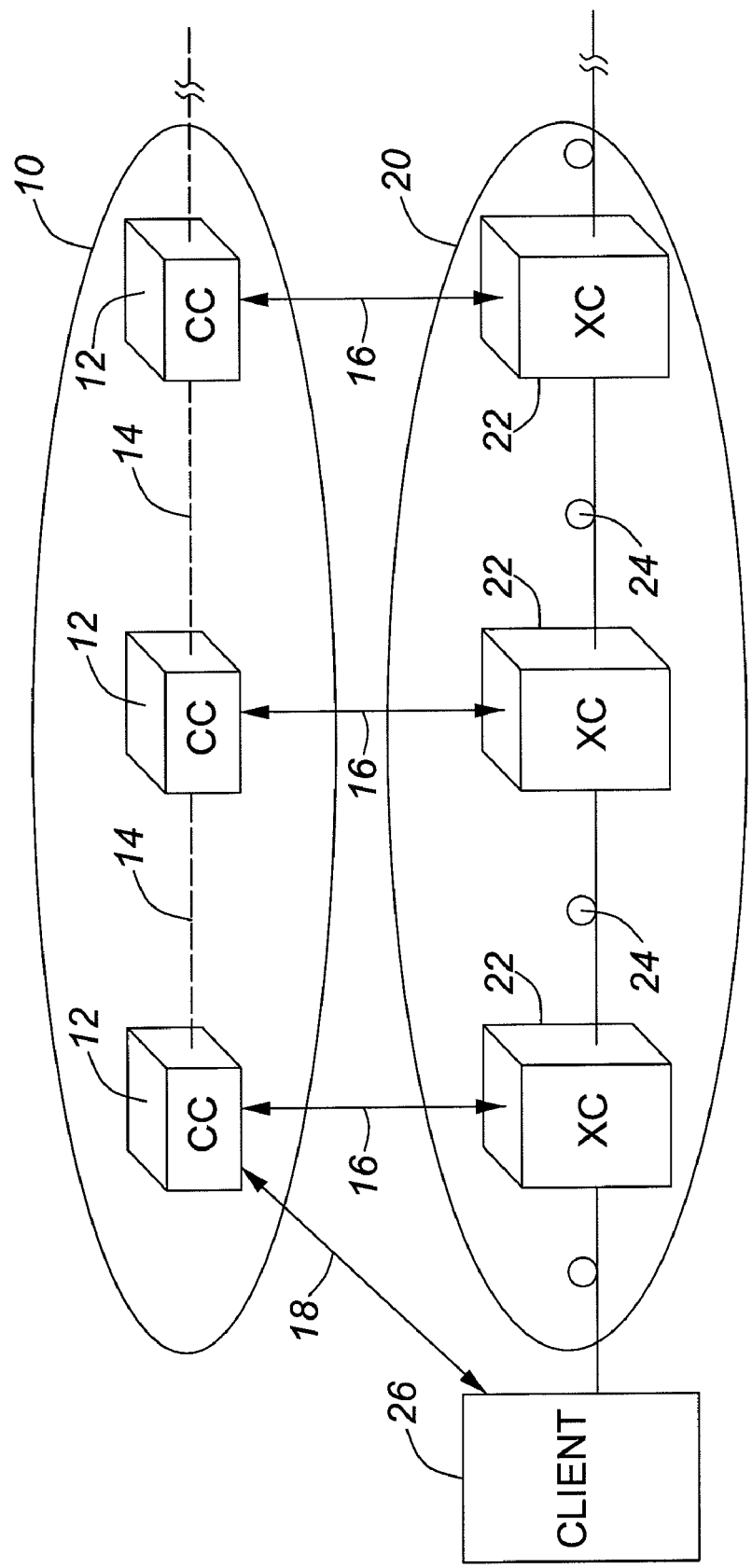
FIG. 1 is a block diagram showing the architectural separation of the control plane and transport plane in the Automatically Switched Transport Network (ASTN)

FIG. 1 is a block diagram showing the architectural separation of the control plane and transport plane in the ASTN. Control Plane 10 may be conceptually thought of as lying 'above' transport plane 20. Control plane 20 comprises a number of Connection Controllers (CCs) 12 which are logical agents each corresponding to a respective physical XC 22 in transport plane 20. XCs 22 are connected via optical links 24. Each CC 12 controls the switching of its respective XC 22 using Connection Control Interface (CCI) signalling 16 communicated over a Data Communication Network (DCN) not shown. In FIG. 1, only 3 CCs 12 and XCs 22 are illustrated. However, typically many hundreds of XCs will be deployed over one or more administrative domains in a meshed topology. CCs 12 communicate between themselves using Network to Network Interface (NNI)—either Internal (I-NNI) or External (E-NNI) signalling communicated over the DCN.

In response to a call request 18 in respect of client 26, for example a TCP/IP client in a user administrative domain, CCs 12 communicate between themselves to provision a connection from client 26 across XCs 22 and optical links 24. This communication may be coordinated according to a joint federation model, a co-operative model or a combined federation model as described in G.8080. Call request 18 is typically mediated by various other agents in the control plane including a Calling Party Call Controller, a Called Party Call Controller and a Network Call Controller which are omitted from FIG. 1 for clarity. Note that computation of the path over which a given connection will be routed is not performed by the CCs 12 but by routing controllers which will be described below.

Figure 2:
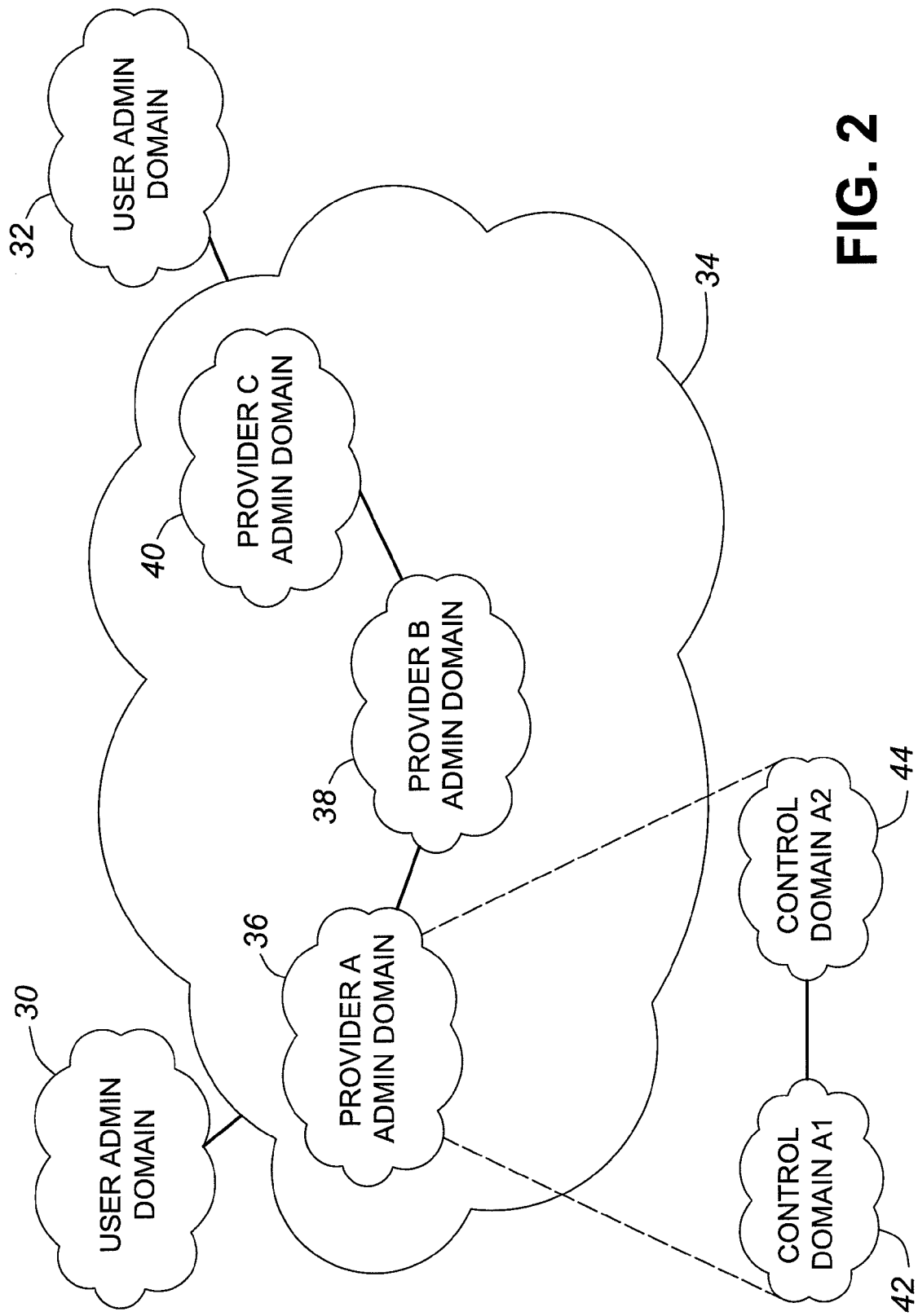
FIG. 2 is a network diagram showing a typical connection path through multiple administrative domains in a photonic network.

FIG. 2 is a network diagram showing a typical connection path through multiple administrative domains in a photonic network. The ASTN control plane standard is being defined to accommodate automatic provisioning of connections across multiple administrative domains (ie subnetworks) while providing interoperability between different vendor technologies and equipments. Thus, a connection provisioned between user administrative to domains 30 and 32 across photonic network 34 may be routed through administrative domains 36, 38, and 40 operated by different telecommunications providers A, B and C. Furthermore, administrative domain 36, for example, may itself be divided into multiple control domains 42, 44 which may employ different vendor equipment or technology, for example.

Figure 3:
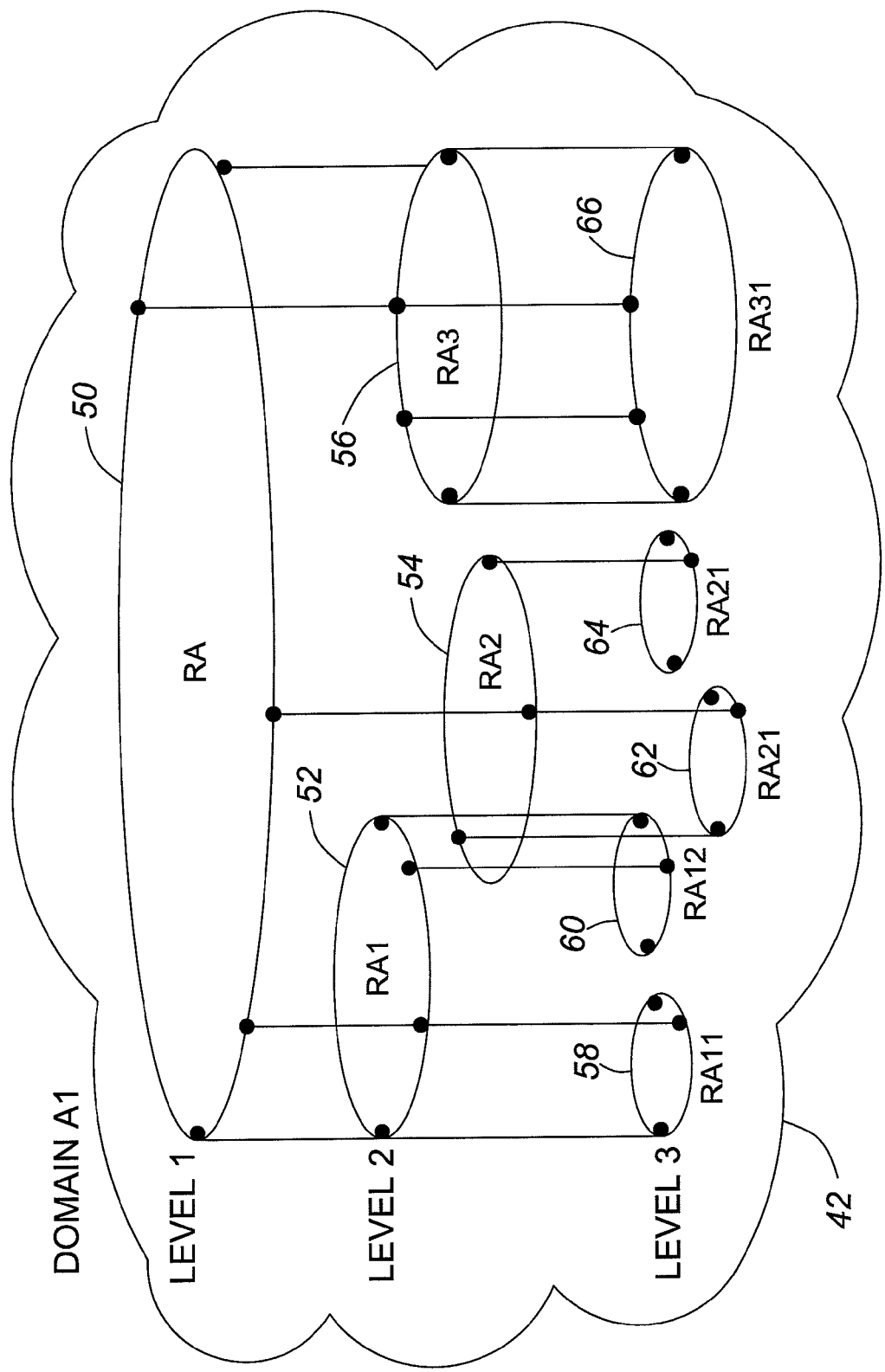
FIG. 3 is a schematic diagram showing a hierarchical arrangement of routing areas within an ASTN control domain.

As well as dividing administrative domains into multiple control domains, each control domain may be further subdivided for routing purposes. FIG. 3 is a schematic diagram showing a hierarchical arrangement of routing areas (RAs) within an ASTN control domain. Control domain 42 is subdivided into a level 1 routing area 50, 3 level 2 routing areas 52, 54, and 56, and 5 level 3 routing areas 58, 60, 62, 64, and 66. Boundary nodes—ie CCs or XCs—are shown in FIG. 3 as dots with dotted lines indicating identity between boundary nodes in routing areas at different hierarchical levels.

The main function of routing is to provide a path selection function as a service to the CCs. Unlike routing in IP networks which is typically hop-by-hop from IP router to IP router, routing in ASTN may be performed according to any of three paradigms known as step-by-step routing, hierarchical routing and source routing. Step-by-step path selection is typically invoked at each node to obtain the next link on a path to a destination. Source and hierarchical routing both involve determining an end-to-end path from a source node to a destination node. Source routing involves determining a complete path from a source node to a destination node in one operation. With hierarchical routing, the end-to-end routing task is broken down into sub steps of routing over various routing areas, the end result of multiple hierarchical steps being the complete path from a source node to a destination node. Note that with all three routing paradigms, cumulative photonic effects will in general need to be considered since the routing paradigms are independent of whether XCs along the end-to-end path are OSs or PSs.

According to G.8080, input to path selection algorithms will include at least the topology context (ie the topology of the network nodes and links which forms the basis for performing path selection) and the destination node, but possibly some or all of following further information: source node, inclusion constraints (ie links or routing areas to include in output paths), exclusion constraints (ie links, routing areas, or path components to exclude from output paths) and a minimization metric (ie a selected link metric that the path selection function should minimize for output paths such as link cost or distance). Routing may be implemented differently in different routing areas according to the particular requirements of the telecommunications provider, for example for geographical reasons. This may involve using different inputs to routing protocols or even different routing protocols in different routing areas.

Figure 4:
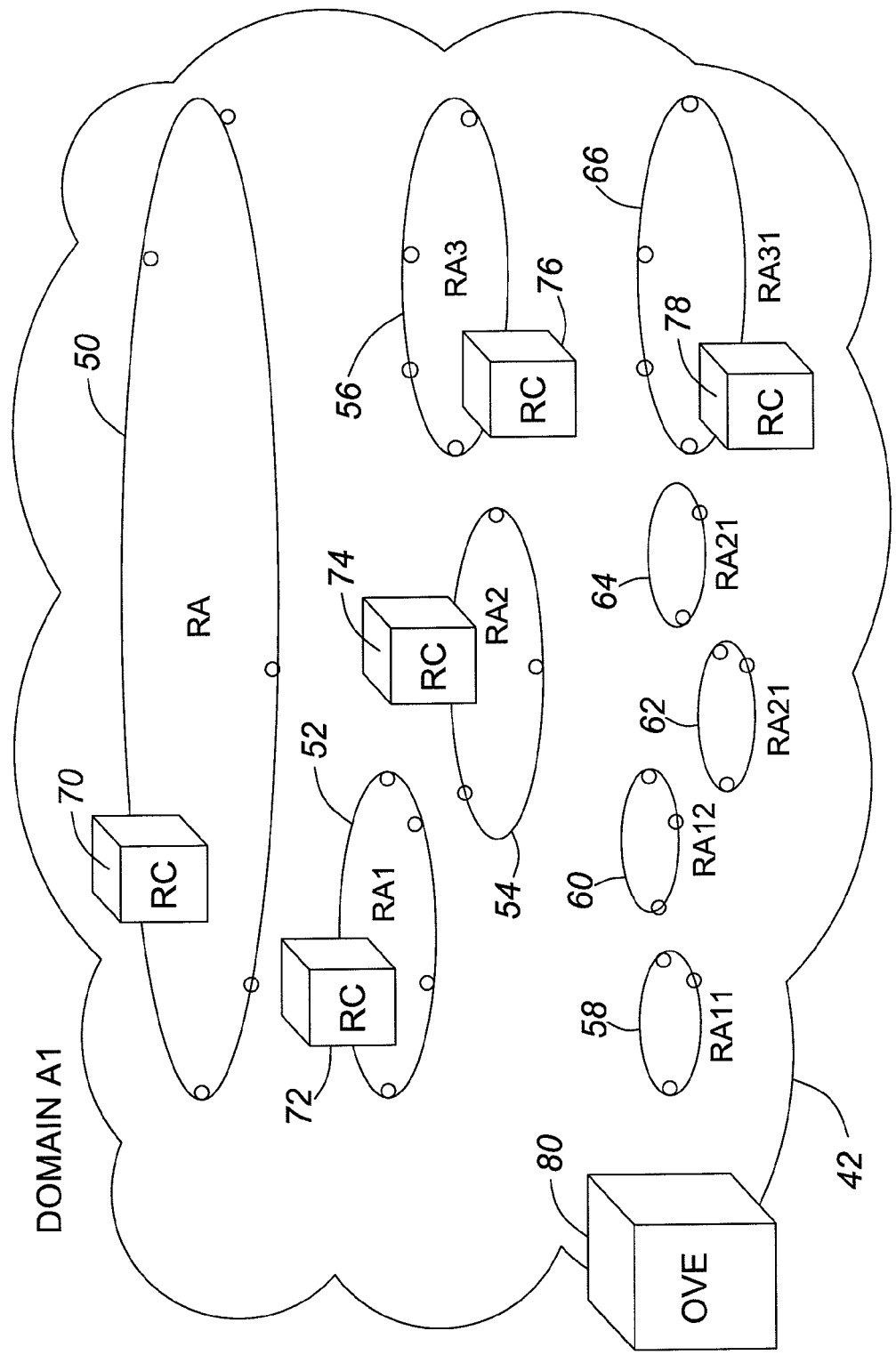
FIG. 4 is a schematic diagram showing a hierarchical arrangement of routing areas within an ASTN control domain with a distributed arrangement of routing controllers and a centralised optical viability engine.
Figure 5:
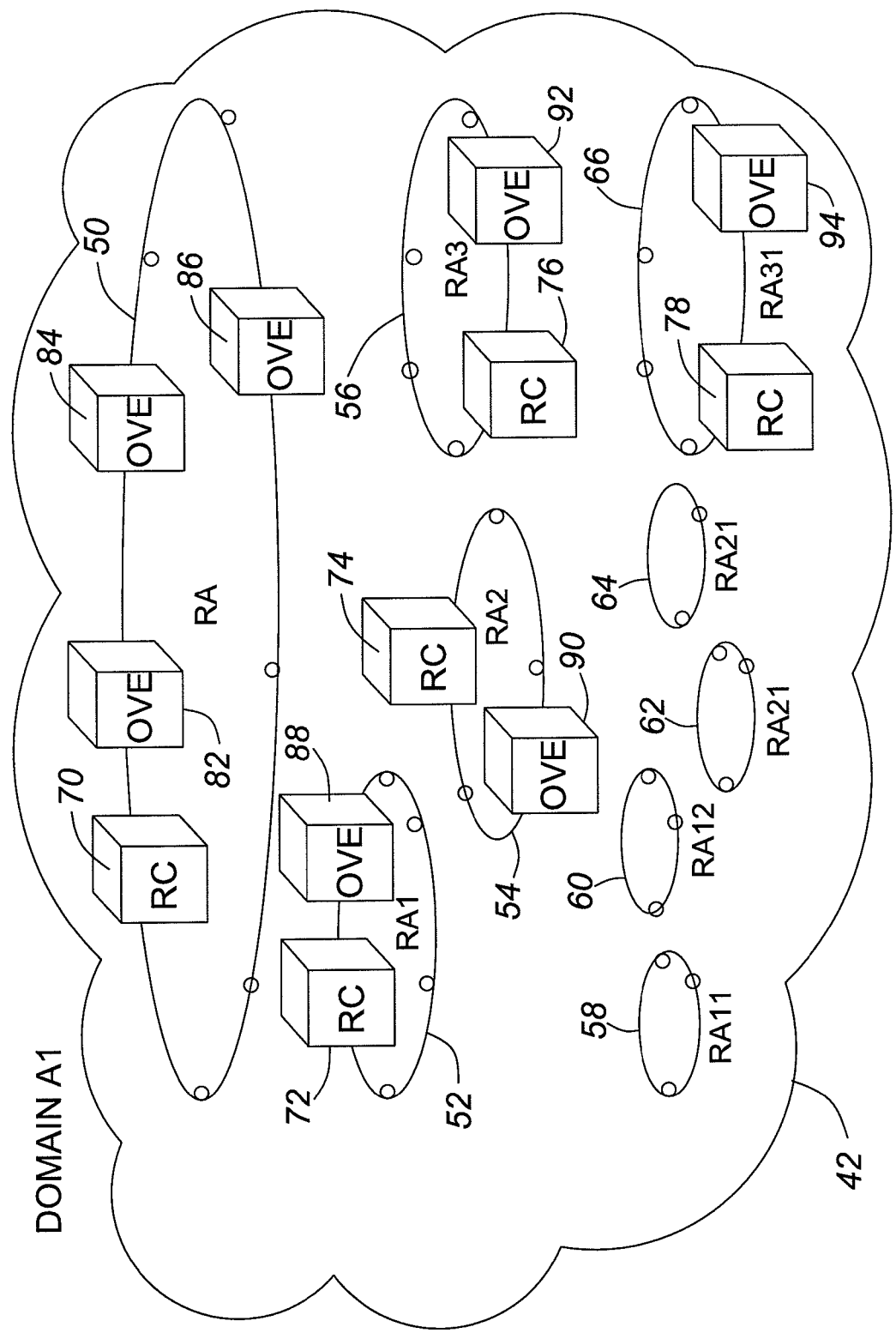
FIG. 5 is a schematic diagram showing a hierarchical arrangement of routing areas within an ASTN control domain with a distributed arrangement of routing controllers and optical viability engines.

Typically, control plane agents known as routing controllers (RCs) will be associated with some or all of the hierarchical routing areas in a control domain of an administrative domain in a photonic network. FIGS. 4 and 5 are schematic diagrams showing embodiments of the present invention in which a hierarchical arrangement of routing areas 50, 52, 54, 56, 58, 60, 62, 64, and 66 within an ASTN control domain 42 each having a dedicated RC 70, 72, 74, 76, 78 (RCs for routing areas 58, 60, 62, 64 omitted for clarity). An RC associated with a given routing area will provide a routing function in respect of that routing area for carrying out step-by-step, source or hierarchical routing. Typically, various of RCs 70, 72, 74, 76, 78 will be invoked when selecting a path through control domain 42 for provisioning an end-to-end connection. Note that paths selected through any of the routing areas, through control domain 42 as a whole, and through administrative domain 36 as a whole will in general form only a segment of the complete path selected to provision the end-to-end connection.

According to the present invention, independently of each RC computing a path across its routing area in response to a connection request, optical viability of a plurality of possible paths in the routing area (but not necessarily across it) are determined in terms of the various photonic effects that may impair the optical signal being transmitted. This is achieved by the RC passing possible paths to an Optical Viability Engine (OVE) function as optical viability queries. For each possible path, the OVE responds by either confirming that the possible path is optically viable or rejecting the possible path as optically non-viable. The functioning of the OVE will be described in greater detail below.

According to the present invention, one or more OVE functions may serve one or more RCs according to a client/server model. OVE functions will be responsible for determining optical viability of possible paths across a predetermined portions (OVE areas) of the control domain. OVE areas may or may not correspond exactly with routing areas. In FIG. 4, OVE 80 is shown as a centralised function serving all of RCs 70, 72, 74, 76, 78 in respect of the whole of control domain 42 according to one embodiment of the present invention. In this embodiment the entire control domain is one OVE area.

According to other embodiment of the present invention, one control domain may comprise a plurality of OVE areas. One OVE area may correspond exactly to one routing area. Alternatively, one OVE area may comprise a plurality of routing areas, or one routing area may comprise a plurality of OVE areas. FIG. 5 shows a distributed arrangement of OVEs 82, 84, 86, 88, 90, 92, and 94 responsible for various different OVE areas (not shown) of control domain 42. Some OVE areas correspond exactly to routing areas (eg OVEs 88, 90, 92, and 94 are respectively responsible for routing areas 52, 54, 56, and 66). In these cases, RCs 72, 74, 76, and 78 are respectively served by OVEs 88, 90, 92, and 94. However, some OVE areas comprise a plurality of routing areas. Those RCs controlling routing areas 58, 60, 62, and 64 (not shown in for clarity) fall within common OVE areas and are not served by dedicated OVEs but, instead, share OVEs 88 and 90. Conversely, one routing area may comprise a plurality of OVE areas. For example, RC 70 is be served by OVEs 82, 84, and 86. In this case, when checking a possible path for optical viability, RC 70 may need to pass an optical viability query to more than one OVE function and may need to select from a plurality of OVE functions in dependence on the possible path to be checked.

The complexity of OVE function may depend on the characteristics of the OVE area for which it is responsible. The precise functioning of various different ways of implementing OVE functions is beyond the scope of this document. However, for example, OVE functions may be implemented according to the following mechanisms:

a) rule-based functions comprising one or more rules—eg, for a given wavelength, if the input possible path contains an optically transparent subpath of more than 4 links then it is optically non-viable; or b) modelling functions which take as their input the static state of the OVE area (in terms of architecture and operational parameters of the optical components deployed), and the dynamic state of the OVE area (in terms of the wavelengths currently provisioned across various links) as well as the path to be checked. These modelling functions then model the performance of the possible path in terms of various photonic effects such as power loss, noise, chromatic dispersion, PMD, XPM, FWM and so on. The components (and operational parameters) that the modelling functions might need information on include the transmitters (wavelength, stability, chirp etc); amplifiers (power or gain, signal to noise ratio etc); fibre spans (type of fibre; length etc); PSs (power loss, signal to noise ratio etc); dispersion compensators (power loss etc); attenuators (power loss); PMD compensators; multiplexers and so on. The parameters may be statically provided on the basis of the component or dynamically measured, for example with tuneable components like amplifiers, attenuators, PMD compensators and so on. To obtain dynamic information about the state of the network, the OVE function may need to receive data from the transport plane.

Figure 6:
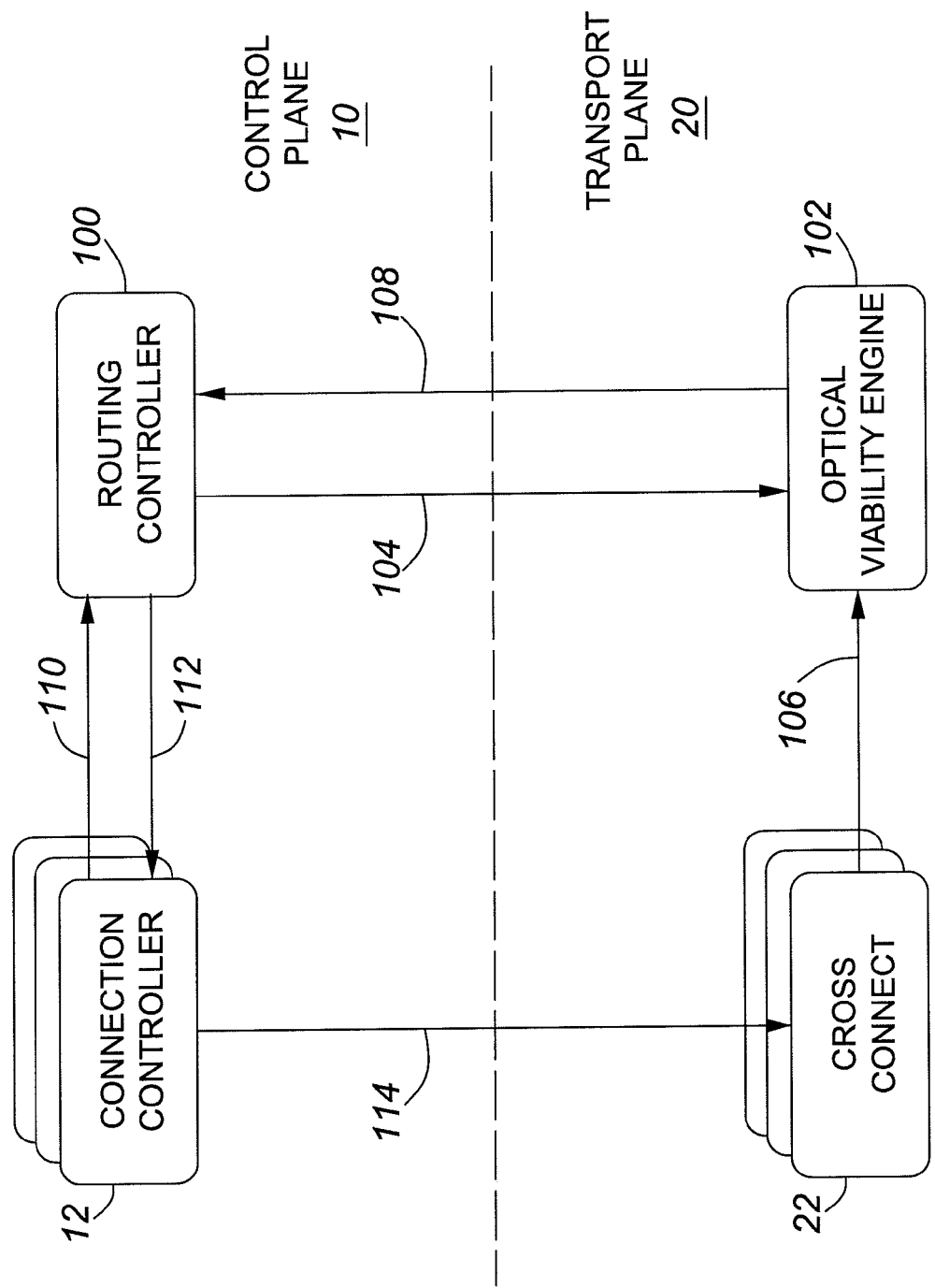
FIG. 6 is a message flow diagram showing the flow of information between a plurality of connection controllers and a routing controller in the control plane and a plurality of cross connects and an optical viability engine in the transport plane of an ASTN network when provisioning a connection.

FIG. 6 shows the flow of information between a plurality of CCs 12 and a RC 100 in the control plane 10 and a plurality of XCs 22 and OVE 102 in the transport plane 20 according to the present invention. Independently of any connection request from CCs 12, RC 100 passes a possible path in its routing area to OVE 102 in the form of an Optical Viability Query message 104 to check optical viability of the possible path. OVE 102 may receive dynamic information concerning the state of the network from XCs 22 via signalling 106. OVE 102 determines whether or not the queried path is optically viable and returns an Optical Viability Response message 108 to RC 100. If the possible path is non-viable, RC 100 discards the path. If, however, the path is optically viable, RC 100 records the path in a database. This process is continued for a plurality of possible paths to form a database comprising a set of optically viable paths in the routing area. Note these optically viable paths need not be paths across the routing area—ie from one boundary node to another—but may be paths wholly within the routing area or terminating on only one boundary node.

For small routing areas, the process may be performed in respect of all possible paths in the routing area, or at least a substantial number of the possible paths in the routing area. However, for larger routing areas, it will not be efficient to try all possible paths—many of them will be un-necessarily long and costly. Thus the likelihood is that the routing controller will start off by checking the k-shortest paths (for which there are standard algorithms for a given value k) between all combinations of XCs in the routing area. Later, load-balancing concerns may cause the generator to change this strategy.

The minimization metric (eg link cost or distance) for a "virtual" link is the combined minimization metrics of the component physical links of the "virtual" link. For example, if a "virtual" link is composed of two consecutive physical links of cost x and y and 3 XCs of cost p, q and r, the combined cost of the "virtual" link is (x+y+p+q+r).

It will be understood that the virtual paths advertised may be a subset or abstraction of the paths generated and found viable. For this reason, similarly, the cost of these virtual paths may be somewhat abstracted from the directly calculated cost (x+y+p+q+r). For example, if one least-cost wavelength-path is found of total cost A and several slightly more expensive wavelength-paths between the same two XCs all of total cost B are found, one virtual link may be advertised between this pair of XCs. The cost of this virtual link may then be any of: A, B, or some weighted combination function of A and B. One of the significant factors in deciding which cost to advertise will be the rate of connection requests being received—the likelihood that contention for resources will cause the least-cost route to be used by the time the connection request actually reaches it.

The routing algorithm may also be required to select resilient paths, i.e. it will be required to select fault-diverse working and protection routes. This is important because many of the "virtual" links will share physical PS to PS links. To achieve this, shared risk link information is associated with each "virtual" link. This information is comprised of the shared risk link information for each of the component physical links of that "virtual" link. Conventional diverse routing mechanisms may then use this shared risk link information to select fault-diverse working and protection routes. Note that the same approach may be taken for nodes as well as links and shared risk node information is associated with each "virtual" link.

Because the routing algorithm may reject certain "virtual" links due to their shared risk information, the routing controller may choose not to check optical viability for the k-shortest paths first. Instead, it may choose to query optical viability for less short possible paths between the same XCs in the routing area to ensure that there are "virtual" links advertised with a range of shared risk information.

The process may also be performed to avoid unnecessary duplication of optical viability queries. For instance, where a possible path between nodes A B C and D is determined to be optically non-viable, it is not necessary to query the OVE as to a possible path between nodes A B C D and E since, by definition, it cannot be optically viable.

Furthermore, since the state of the network may change dynamically (ie a link may fail or a wavelength may be added or removed from a link) the process of creating a database of optically viable paths is on-going. Paths previously to determined to be optically viable may be rechecked for optical viability (periodically or in response to changes in the state of the network) and removed from the database if no longer optically viable. Similarly, paths which are no longer possible as a result of link failure may be removed from the database. Conversely, paths previously determined to be optically non-viable may be rechecked for optical viability (periodically or in response to changes in the state of the network) and added to the database if found to be optically viable.

To provision a connection across the routing area, one of CCs 12 passes a routing request 110 (known in ASTN as a Route Table Query) to RC 100 identifying an unresolved route element (ie the end points of the connection to be provisioned). RC 100 then computes a path using an algorithm of a conventional routing protocol such as OSPF or IS-IS. However, the algorithm does not use the actual physical links and their topology as its topology input. Instead, it uses the optically viable paths as "virtual" links in its topology input. These "virtual" links may be composed of one or more consecutive physical links in the routing area.

Once the algorithm computes a "virtual" path, which may comprise one or more consecutive "virtual" links, the "virtual" path is converted into a physical path, ie an ordered set of XCs, by replacing "virtual" links of the "virtual" path with their respective physical XCs. This physical path is then returned to the requesting CC 12 in the form of a Route Table Query Response 112. The path may then be provisioned by CC 12 using control message 114 to control the appropriate XCs.

Figure 7:
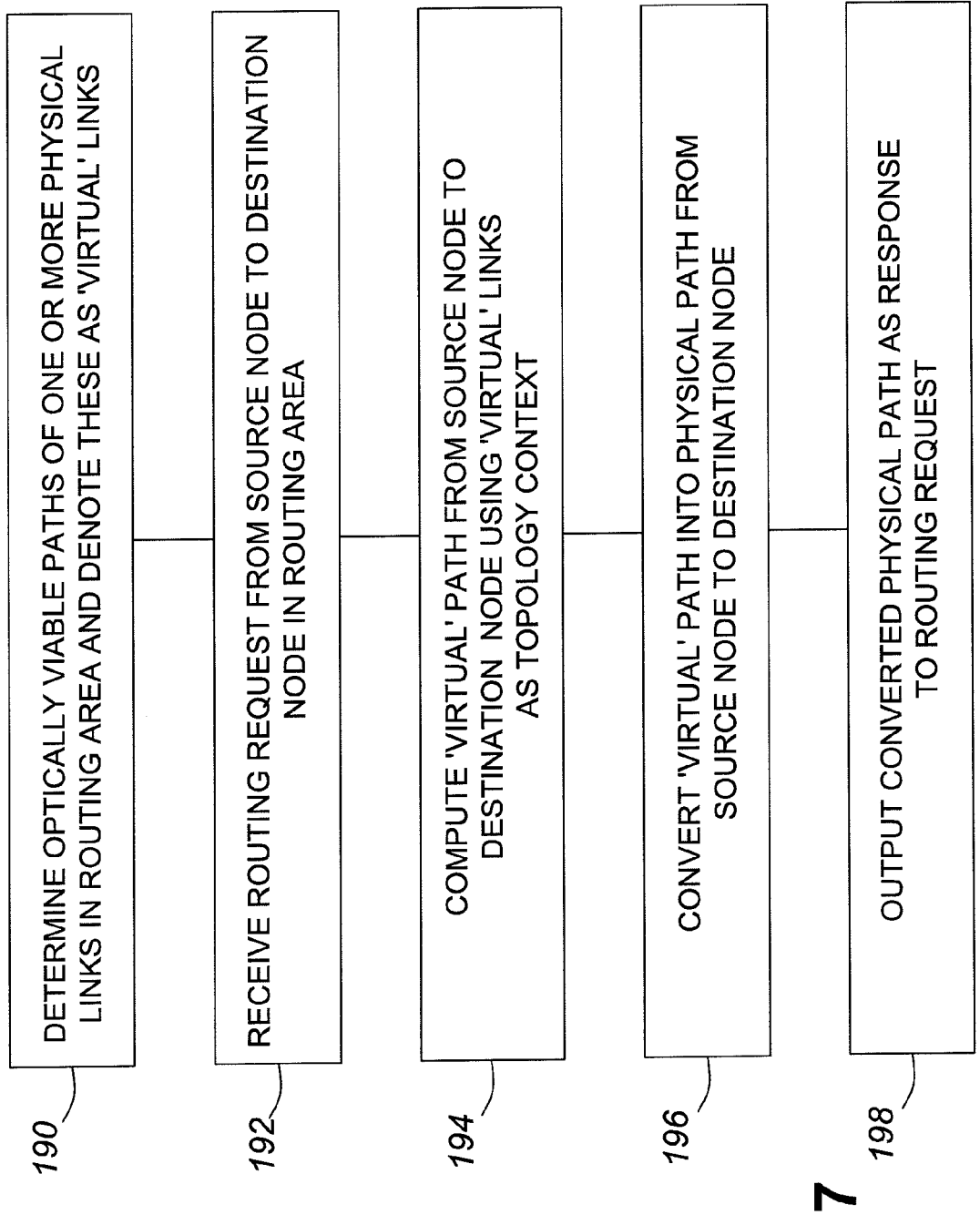
FIG. 7 is a flow diagram showing the process of determining optically viable "virtual" links and responding to a routing request as performed by a routing controller, according to the present invention.

FIG. 7 is a flow diagram showing the process of determining optically viable "virtual" links and responding to a routing request as performed by a routing controller, according to the present invention. The process begins at step 190 where optically viable paths within a routing area are determined in an on-going process as described above. These paths are denoted "virtual" links and are stored in a database. Note that this step is carried out prior to but independently of any received routing requests. Next, at step 192, a routing request is received specifying a source and destination node (ie XCs) in the routing area. The process continues to step 194, where a "virtual" path is computed using a conventional routing algorithm using "virtual" links as its topology context instead of physical links. Next, at step 196, the computed "virtual" path is converted into a physical path by replacing "virtual" links of the "virtual" path with their respective physical links giving an ordered set of nodes forming the physical path from source to destination node. Finally, at step 198, the converted physical path is output a response to the routing request.

In one embodiment of the present invention, possible paths comprising the same physical links are differentiated and treated separately on the basis of different wavelengths. They are separately checked for optical viability and advertised as separate "virtual" links for routing purposes. Although these possible paths use different wavelengths to traverse the same physical links, they may differ in optically viability for many reasons, in particular where connections of close wavelengths are already provisioned across some or all of their component physical links which may cause interference with the possible paths. In another embodiment of the present invention, possible paths are not separately advertised for different wavelengths. If any wavelength paths are optically viable over a possible path comprising the same physical links, one "virtual" link is advertised to the routing function.

Figure 9:
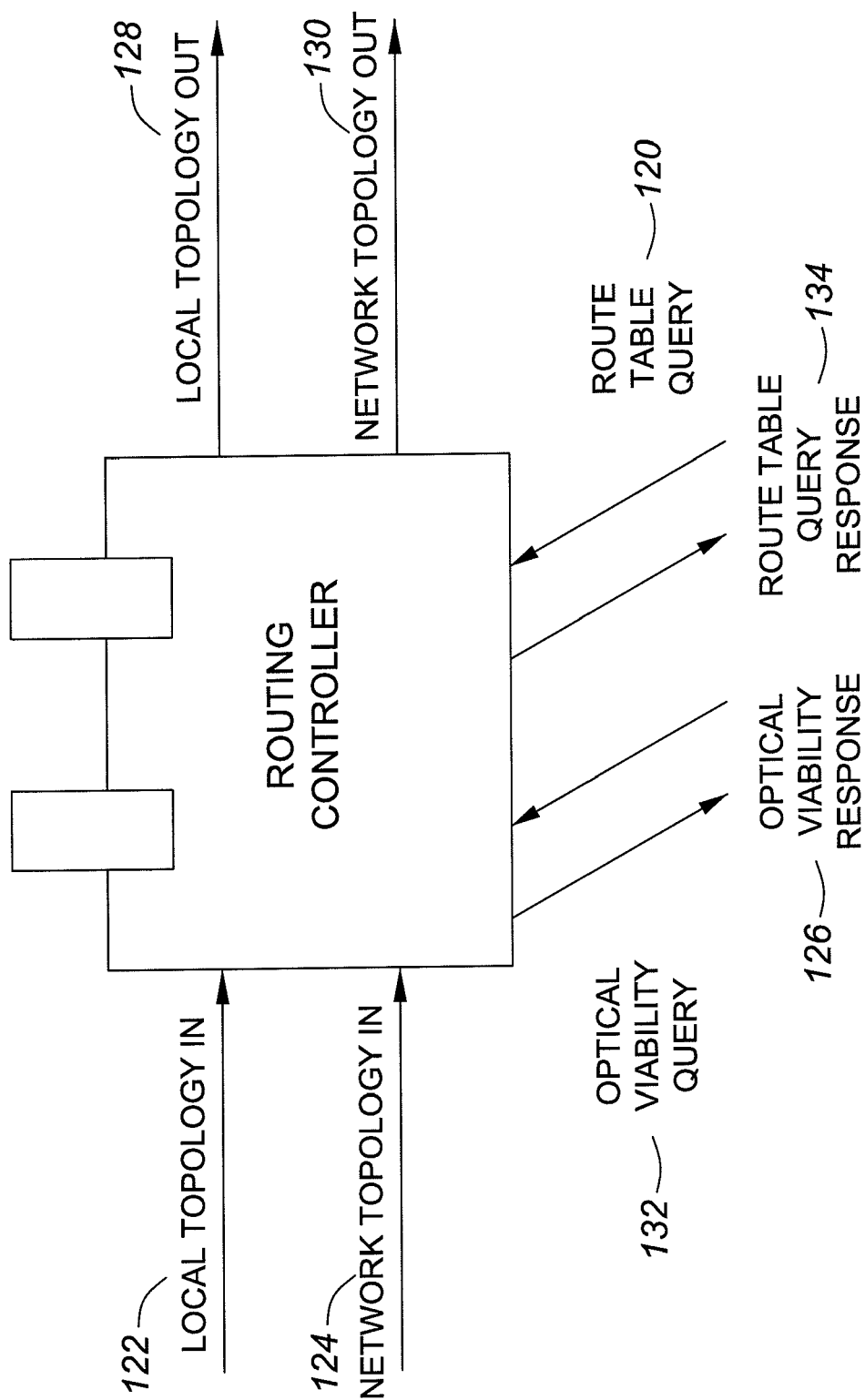
FIG. 9 shows in graphical form the interfaces of a RC.

To implement the present inventions in photonic networks complying with the ASTN recommendations, modifications are necessary to the interface functionality of RCs described in G.8080. FIGS. 8 and 9 show the modifications to Table 3/G.8080 and FIG. 13/G.8080 of clause 7.3.2 of G.8080. FIG. 7 shows in table form the interfaces of a RC according to the present invention. Interfaces 120, 122, 124, 128 and 130 are as set out in Table 3/G.8080 of G.8080. Interfaces 126 and 132 are modifications according to the present invention. Interface 120 shows the Route Table Query input interface to a RC. The basic input parameter is an unresolved route element (ie the end points of the connection to be provisioned). The basic output parameter is an ordered list of Subnetwork Termination Point Pools (SNPPs) (ie data identifying an ordered list of XCs). Interface 122 shows the Local Topology In input interface to a RC. The basic input parameter is a local topology update. Interface 124 shows the Network Topology In input interface to a RC. The basic input parameter is a network topology update. Interface 126 shows an Optical Viability Response input interface to a RC. The basic input parameter is an Optical Viability Response received from an OVE—ie a Boolean response: "yes" or "no". Interface 128 shows the Local Topology Out output interface from a RC. The basic output parameter is a local topology update. Interface 130 shows the Network Topology Out output interface from a RC. The basic output parameter is a network topology update. Interface 132 shows an Optical Viability Query output interface from a RC. The basic output parameter is an ordered list of SNPPs (ie data identifying an ordered list of XCs representing a path to be checked for optical viability).

FIG. 8 shows in graphical form the interfaces of a RC according to the present invention. Interfaces 120, 122, 124, 128 and 130 are as set out in Table 3/G.8080 of G.8080. Interfaces 126 and 132 are modifications according to the present invention. Interface 122 shows the Local Topology In input interface to a RC. Interface 124 shows the Network Topology In input interface to a RC. Interface 128 shows the Local Topology Out output interface from a RC. Interface 130 shows the Network Topology Out output interface from a RC. Interface 132 shows an Optical Viability Query output interface from a RC. Interface 126 shows an Optical Viability Response input interface to a RC. Interface 120 shows the Route Table Query input interface to a RC. Interface 134 shows the Route Table Query Response output interface from a RC.

Figure 10:
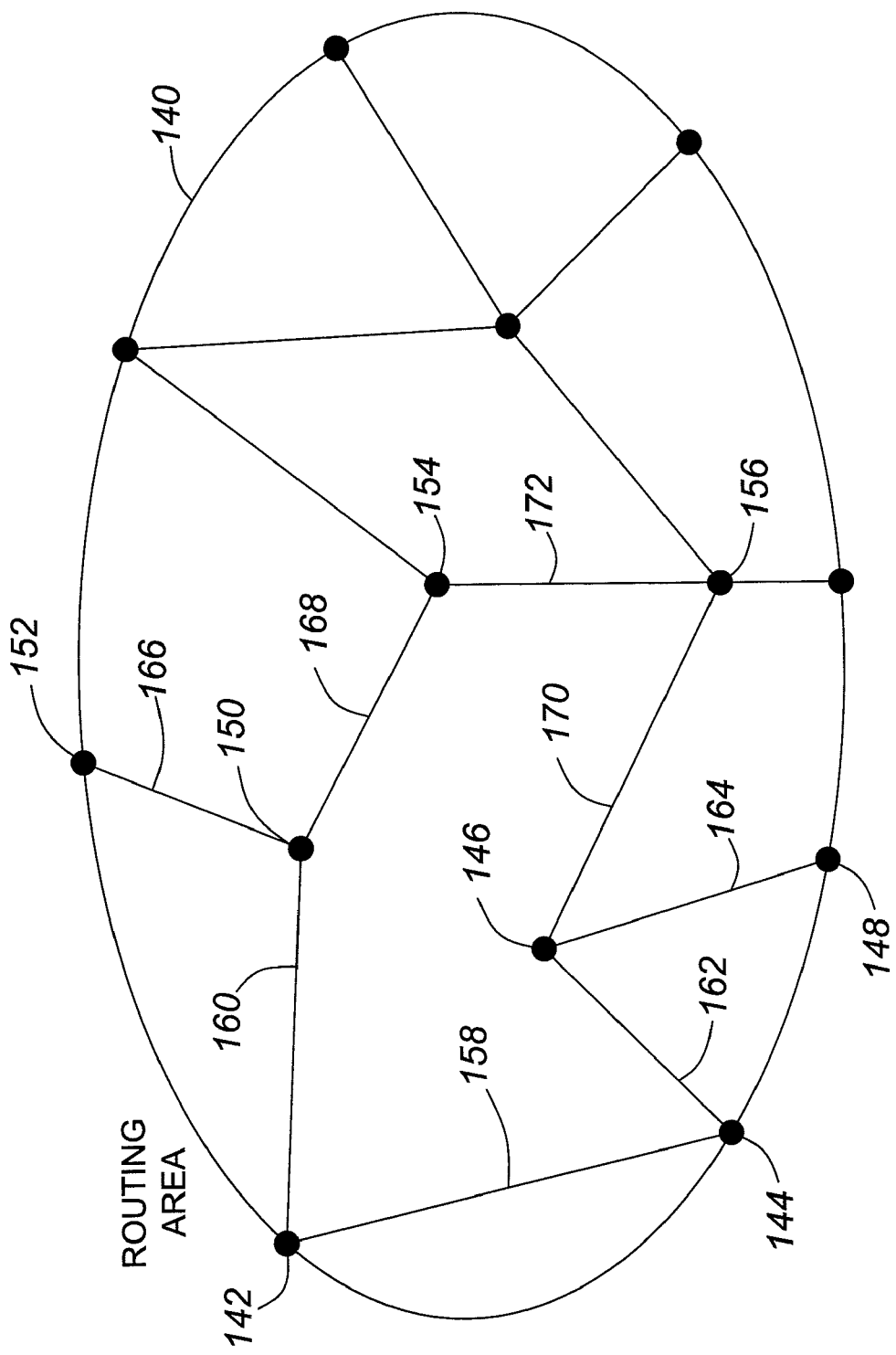
FIGS. 10 and 11 are schematic diagrams showing nodes of a routing area and the physical and "virtual" links between them.
Figure 11:
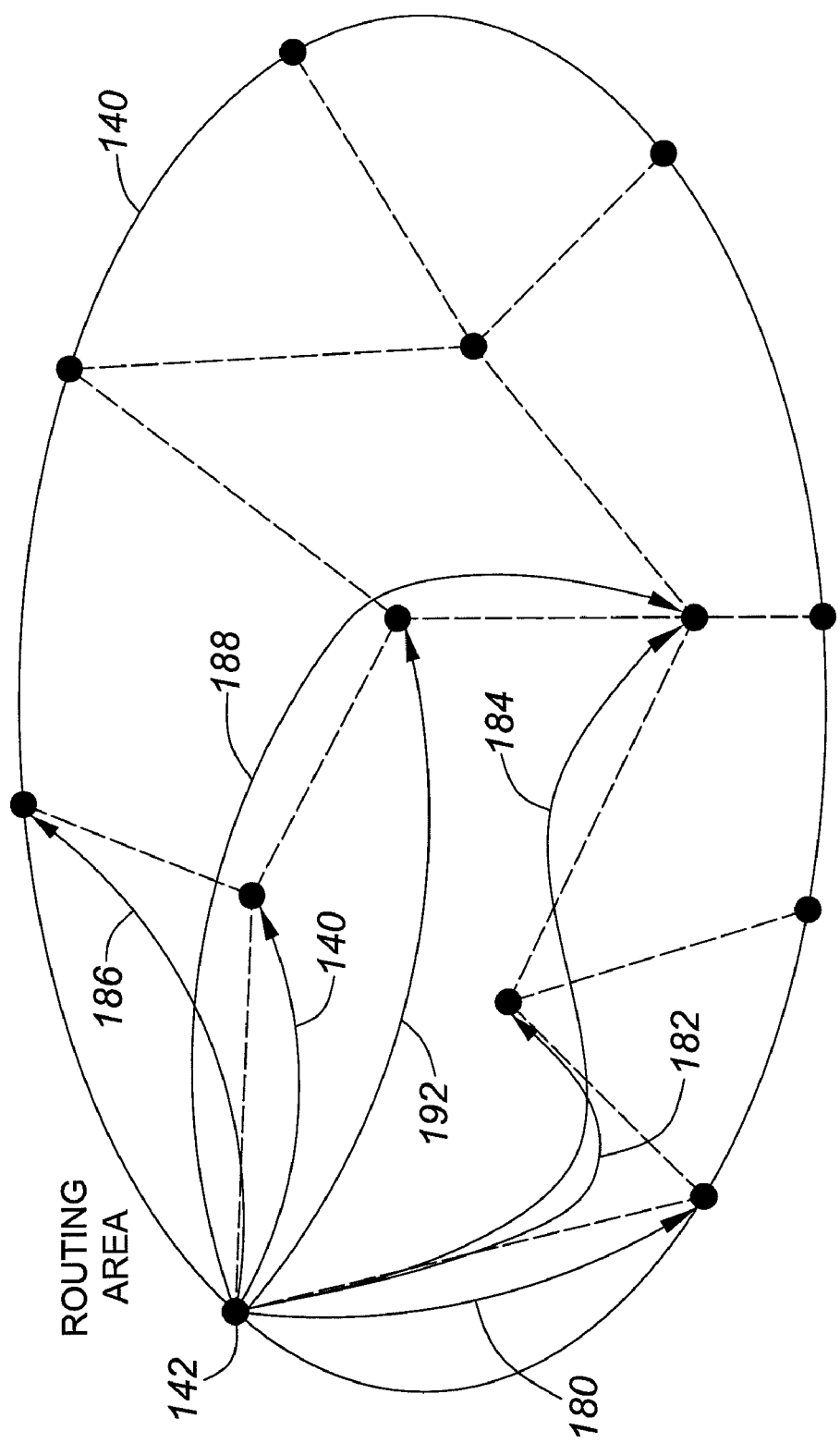

FIGS. 10 and 11 are schematic diagrams showing nodes of a routing area and the physical and "virtual" links between them. Both figures are simplified for the purposes of illustration. FIG. 10 shows a routing area 140 containing a plurality of XCs 142, 144, 146, 148, 150, 152, 154 and 156 as well as others. Linking various of these XCs are physical links 160, 162, 164, 166, 168, 170 and 172 (represented by solid straight lines). FIG. 11 shows the same routing area 140 with the same XCs and physical links (represented by dotted straight lines), as well as "virtual" links (represented by solid curved lines) from XC 142 to XCs 144, 146, 148, 150, 152, 154 and 156. These "virtual" links are illustrative of optically viable possible paths from XC 142. When creating a set of optically viable paths in a routing area, possible paths from s other than XC 142 will also be checked for optical viability. However, for clarity, only those optically viable paths from XC 142 are illustrated as "virtual" links.

Note that some of these "virtual" links are composed of single physical links—for example, "virtual" link 180 comprises only physical link 158 and "virtual" link 190 comprises only physical link 160. However, other "virtual" links are composed of multiple physical links—for example, "virtual" link 182 comprises physical links 158 and 162, "virtual" link 192 comprises physical links 160 and 168, and "virtual" link 186 comprises physical links 160 and 166. Also note that "virtual" links 184 and 188 terminate at the same XCs—ie XCs 142 and 156. However, these are separate "virtual" links because they traverse different physical links—"virtual" link 184 traverses physical links 158, 162, and 170 whereas "virtual" link 188 traverses physical links 160, 168 and 172. The minimization metrics for "virtual" links 184 and 188 will typically be different and hence they will be treated differently by the routing algorithm.

Since a "virtual" path computed by a given RC will in general contain a plurality of "virtual" links each of which is optically viable alone, but not necessarily optically viable in combination, it is important to ensure that the "virtual" path as a whole is optically viable when a connection is actually provisioned across it. This may be achieved by having the termination nodes of all "virtual" links perform OEO conversion at least for the wavelengths provisioned across "virtual" paths containing those "virtual" links. Since photonic effects can only accumulate across photonically transparent paths, performing OEO conversion effectively "resets" any photonic effects that have accumulated in a signal transmitted across one "virtual" link so that the optical viability of "virtual" links need not be considered in combination.

In one embodiment of the present invention, when creating the set of optically viable paths (ie "virtual" links) in a routing area, only those optically viable paths with terminating OSs (ie XCs which perform OEO conversion for all wavelengths and are incapable of switching any wavelengths photonically) are selected. Thus, any "virtual" paths composed of one or more "virtual" links is guaranteed to be optically viable. In another embodiment of the present invention, when creating the set of optically viable paths in a routing area, only those optically viable paths with terminating XCs which are capable of functioning as either OSs or PSs (ie XCs which can be dynamically controlled to either perform OEO conversion or switch wavelengths photonically) are selected. Then, when actually routing a connection across a "virtual" path containing a plurality of "virtual" links, terminating XCs of the "virtual" links are dynamically controlled to perform OEO conversion—ie to operate as OSs. This dynamic control may, if the XC permits, be effected on a per wavelength basis so that only those wavelengths used to provision a connection across a "virtual" path containing a plurality of "virtual" links are switched electronically, leaving other wavelengths photonically switched.

Since a path computed by a given RC through its routing area will in general form only a segment of the complete path selected to provision the end-to-end connection, it is also necessary to ensure that XCs at boundary of routing areas perform OEO conversion at least for the wavelengths provisioned across those paths. In one embodiment of the present invention, this is achieved by statically deploying OSs (ie XCs which perform OEO conversion for all wavelengths and are incapable of switching any wavelengths photonically) at the boundaries of routing areas. Note that this approach does not result in routing areas being equivalent to the prior art "optical islands" described above, since not all XCs with a routing area will be PSs and not all paths through a routing area will be optically viable. However, some purely photonic paths through a routing area will be optically viable and typically longer (or contain a greater number of links) than would be the case if the network were designed to contain 100% optically viable "optical islands." In another embodiment of the present invention, this is achieved by deploying XCs which are capable of functioning as either OSs or PSs (ie XCs which can be dynamically controlled to either perform OEO conversion or switch wavelengths photonically) at the boundaries of routing areas and by dynamically controlling these XCs to perform OEO conversion.

In alternate embodiments of the present invention, the OVE function may return a non-Boolean response to the Optical Viability Query. For instance, the optical viability of a path may be expressed as a confidence interval (ie a percentage figure) representing a level of confidence that a connection provisioned across the path will provide an acceptable level of performance in terms of signal quality or bit error rate.

It will be seen from the above that the present invention provides a method of and system for determining a path through which to route a connection in a photonic network which produces optically viable paths without routing algorithms needing to consider optical viability directly and without needing to deploy "optical islands."

As mentioned above, the reader will appreciate that the present invention is not limited to photonic networks complying with the ASTN recommendations, but applies in general to any photonic network in which connections may be routed.

The invention claimed is:

1. A method of selecting an optically viable path through which to route a connection from a first node to a second node of a photonic network, the method comprising:
    selecting a plurality of optically viable photonic paths in the photonic network, at least one of the optically viable photonic paths comprising a plurality of consecutive optical links;
    selecting a path from the first node to the second node taking account of the plurality of optically viable photonic paths as at least part of the topological context when selecting the path
    wherein the step of selecting a plurality of optically viable photonic paths comprises
    passing data identifying a first possible path in the photonic network to an optical viability checking function;
    in response, receiving data indicating a measure of optical viability of the first possible path from the optical viability checking function; and
    determining whether to include the first possible path in the plurality of optically viable photonic paths in dependence on the received data.

2. A method according to claim 1, wherein the data indicating a measure of optical viability of the first possible path is generated by modelling cumulative photonic effects that would occur if a connection were provisioned over the first possible path.

3. A method according to claim 2, wherein the cumulative photonic effects are modelled on the basis of the data representing the static state of at least part of the photonic network.

4. A method according to claim 2, wherein the cumulative photonic effects are modelled on the basis of the data representing the dynamic state of at least part of the photonic network.

5. A method according to claim 1, wherein the data indicating a measure of optical viability of the first possible path is generated by performing a rule-based function in respect of the possible path.

6. A method according to claim 1, wherein the step of selecting a plurality of optically viable photonic paths comprises the step of passing data identifying a second possible path in the photonic network to an optical viability checking function in dependence on the received data indicating a measure of optical viability of the first possible path.

7. A method according to claim 1, wherein only those optically viable photonic paths with terminating nodes which perform electronic switching are included in the plurality of optically viable photonic paths.

8. A method according to claim 1, wherein only those optically viable photonic paths with terminating nodes which are capable of being dynamically controlled to perform electronic switching are included in the plurality of optically viable photonic paths, and wherein the method comprises the step of:
    provisioning a connection across the selected path from the first node to the second node;
    controlling terminating nodes of one or more optically viable photonic paths of the selected path to perform electronic switching at least for an optical wavelength provisioned.

9. A method according to claim 1, wherein the data indicating a measure of optical viability is a Boolean result.

10. A method according to claim 1, wherein the data indicating a measure of optical viability is a confidence interval.

11. A computer program stored on a computer readable medium for performing the method of any preceding claim 1.

12. Apparatus arranged to perform the method of claim 1.

13. A system for use in a photonic network, the system comprising:
    a database arranged to store a plurality of optically viable photonic paths in the photonic network, at least one of the optically viable photonic paths comprising a plurality of consecutive optical links; and
    a routing function arranged to select a path in the photonic network taking account of the plurality of optically viable photonic paths as at least part of the topological context when selecting the path,
    an optical viability checking function arranged to determine a measure of optical viability of a possible path in the photonic network; and
    a path selection function arranged to selectively include the possible path in the database in dependence on the determined measure of optical viability of the possible path.

14. A system according to claim 13, wherein the optical viability checking function comprises a cumulative photonic effects modeller arranged to model cumulative photonic effects that would occur if a connection were provisioned over the possible path.

15. A system according to claim 14, wherein the cumulative photonic effects modeller is arranged to model cumulative photonic effects on the basis of the data representing a static state of at least part of the photonic network.

16. A system according to claim 14, wherein the cumulative photonic effects modeller is arranged to model cumulative photonic effects on the basis of the data representing the dynamic state of at least part of the photonic network.

17. A system according to claim 13, wherein the optical viability checking function comprises a rule-based function operating on the possible path.

18. A photonic network comprising a system according to claim 13.

* * * * *